Nov. 26, 1968 R. S. PAULIUKONIS 3,412,573
CRYOGENIC QUICK FREEZING APPARATUS
Filed Sept. 21, 1966 2 Sheets-Sheet 1

INVENTOR.
RICHARD S. PAULIUKONIS

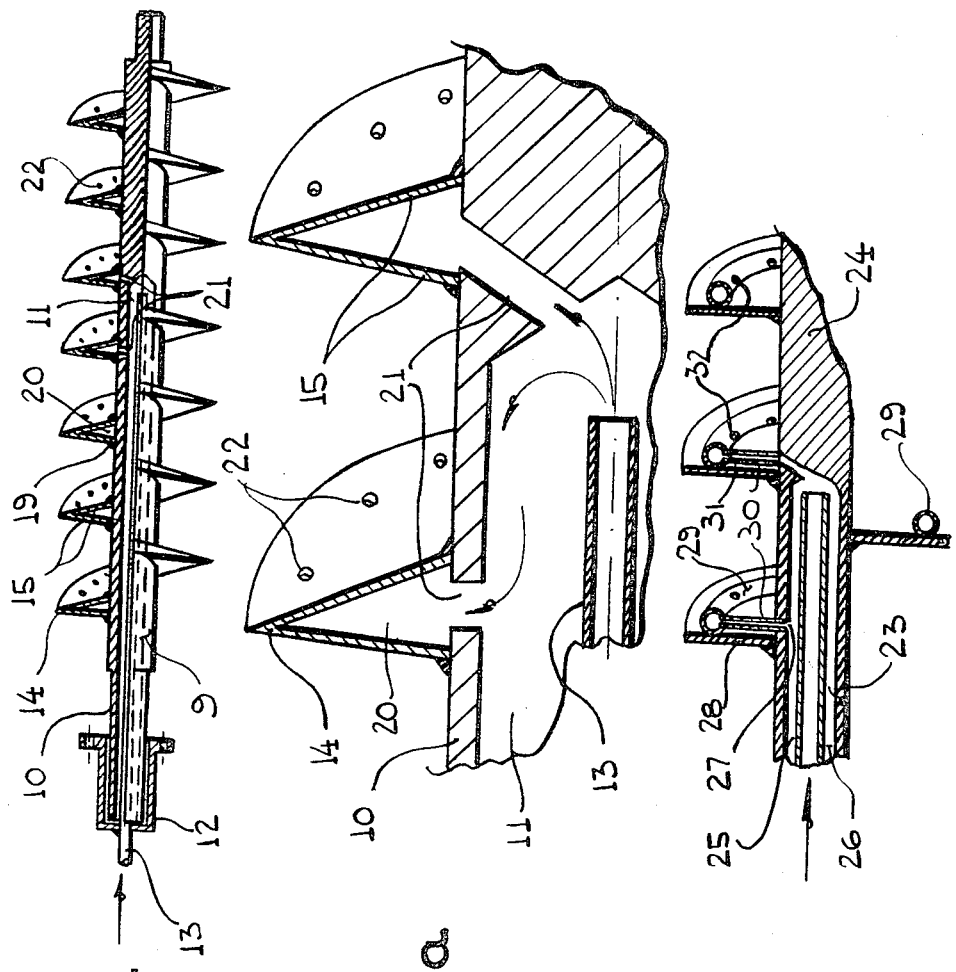

United States Patent Office 3,412,573
Patented Nov. 26, 1968

3,412,573
CRYOGENIC QUICK FREEZING APPARATUS
Richard S. Pauliukonis, 6660 Greenbriar Drive,
Cleveland, Ohio 44130
Filed Sept. 21, 1966, Ser. No. 581,094
5 Claims. (Cl. 62—374)

ABSTRACT OF THE DISCLOSURE

A quick freezing system accomplishes freezing with a helical feeder to which refrigerant is supplied. The helical feeder is within a cylindrical feeder chamber and has a plurality of orifices from which the refrigerant is discharged into the interior of the freezer chamber from which it is vented in gaseous form.

---

This invention relates to apparatus for freezing materials with cryogenic fluids and more particularly to an improved quick freezer suitable for rapid lowering of temperatures of a variety of products in bulk or in separate packages, including fluids.

In general, use of such apparatus is indicated when it is desired that freezing of the product be extremely rapid with cooling rates optional for a specific product.

In one application the invention can be used to produce better ice cream, quality of which is known to improve dramatically with accelerated freezing. In other applications it can be used for quick freezing a variety of foodstuffs from shrimp to prepackaged meals.

The invention is applicable to a continuous freezing on a large scale basis in plants processing various products as well as to an intermittent operation on small scale basis as in ice cream stands or the like.

The invention is also suitable for quick freezing objects or substances other than foodstuffs to temperatures approaching those of the refrigerants which can be selected from a variety of cryogenic fluids.

For freezing foodstuffs and biological matter, the invention considers the use of liquid nitrogen boiling at minus 320.5° F. and/or liquid air boiling at minus 317.9° F. as these refrigerants are currently available at least cost.

Other refrigerants such as nitrous oxide, carbon dioxide etc. could be employed as well.

The current trend in quick freezing is towards the utilization of large tunnels provided with long conveyors for a progressive product motion within the freezer, and long spray headers provided with nozzles or jets for the supply of the refrigerant such as liquid nitrogen in a form of a very cold vapor. In order to accelerate processing time for increased capacity without producing poorly frozen product, these tunnels by necessity must employ fans and internally mounted conveyors contributing to the heat gain and resulting in complex and inefficient freezing units.

Faster freezing rates with improved efficiency and higher production output can be materialized by resorting to a novel design of equipment with additional advantages in the overall cooling process subject to the present invention.

The general object of the present invention is to provide quick freezing means of unlimited capacity with improved production efficiency. More specifically, an object of the invention is to provide a quick freezing system serviced by an apparatus which enables removal of heat from the product at rates compatible with the productive capacity of the refrigerant, with greatly improved processing time.

Further object of the present invention is to provide a novel concept of quick freezing suitable for solids and liquids.

It is a still further object of this invention to provide an apparatus for an accelerated production of ice cream, chocolate and/or other products of improved quality attainable only through a rapid cooling-freezing technique which employes expandable refrigerants.

Other objects and advantages of this invention will be apparent from the ensuing disclosure and the appended claims.

In the drawings:

FIGURE 2 is a sectional view of a helical feeder suitable for use in fabricating quick freezer of this invention wherein the hollow structure of helix serves as passage means for refrigerant supply and distribution.

FIGURE 2a shows an enlarged view of helix hollow structure identifying refrigerant supply and distribution passages in detail.

FIGURE 3 is a cross sectional view of a modified feeder of this invention with tubular coil integrally mounted to a solid helix to serve as passage means for refrigerant supply and distribution in lieu of hollow helix structure shown in FIGURE 2, the modification representing design simplification to reduce feeder manufacturing cost.

Figure 1:
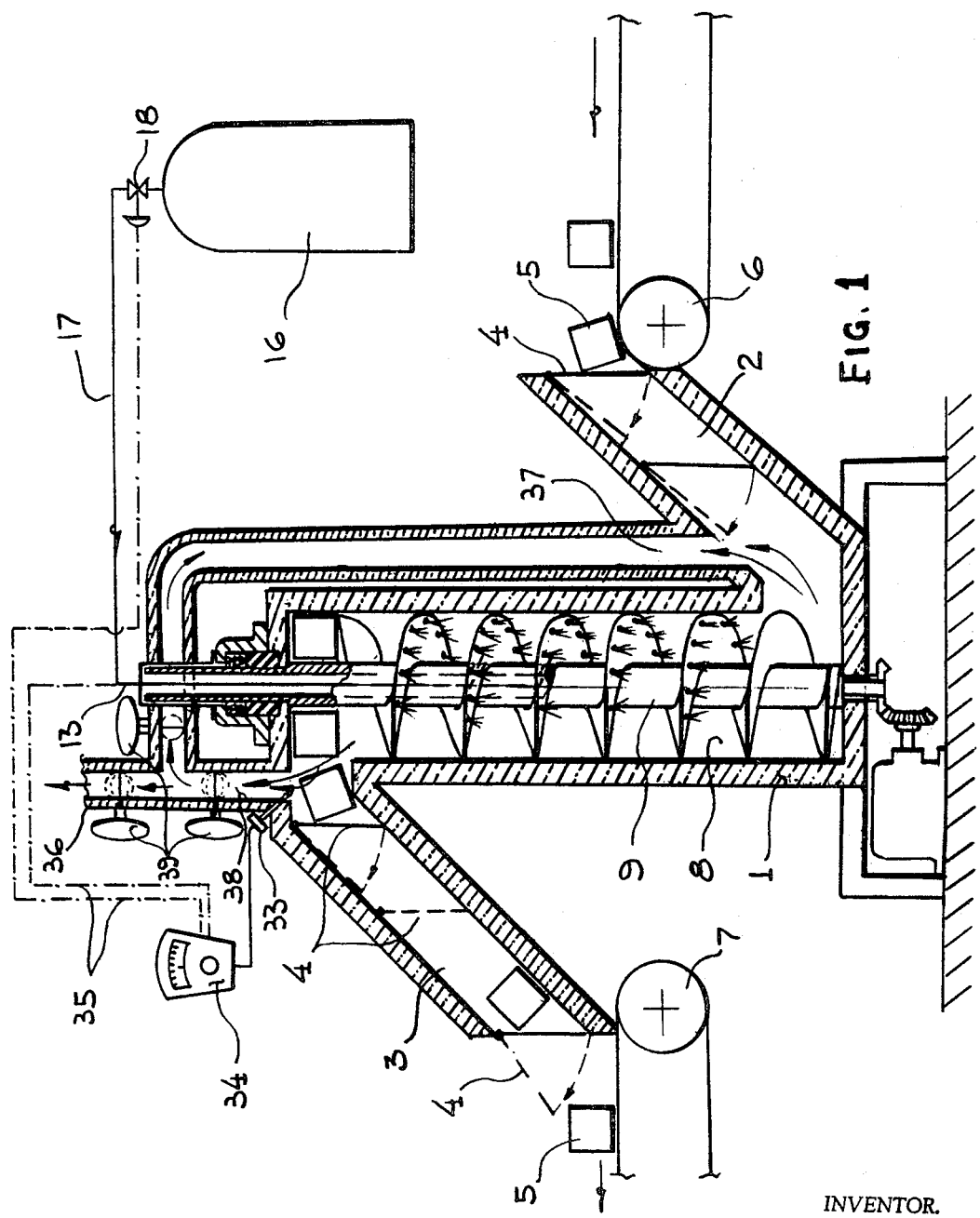
FIGURE 1 is a front elevation view in section of a quick freezing apparatus of the present invention in a system.

FIGURE 1 illustrates the general arrangements of quick freezer in a vertical system, although freezer could be mounted in any other attitude such as horizontal or inclined. As FIGURE 1 shows, the insulated double-walled construction cylindrical body 1 is provided with two double-walled, insulated openings. The opening 2 permits entrance of the product before freezing and opening 3 serves for product exit after freezing. Conveniently located appropriate baffles 4, preferably magnetic floppers hinged inside said entrance-exit openings are provided to restrict exfiltration of cold nitrogen gas during the product transit through the freezer proper 8 including air infiltration from outside. Said baffles 4 open when product 5 delivered either by belt conveyor 6 to the freezer opening 2 or by helical feeder 9 to the exit opening 3 at the top of the freezer exerts a pressure of few ounces. Conveyor 7 provided at the end of the exit opening 3 receives processed-frozen product 5. The arrangement described enables freezer operation under slight positive pressure permitting a continuous product throughput with minimum heat losses.

The freezer proper 8 is provided with helical feeder 9 which rotates and moves product axially from the entrance opening 2 to the exit opening 3 and also serves as means for refrigerant supply and distribution in a most efficient manner.

As FIGURE 1 shows, the refrigerant, normally housed in an appropriate size dewar 16 may be delivered to the freezer via transmission conduit 17 provided with a pneumatically piloted (could also be electrically operated) flow-control valve 18, to enter rotating helical feeder 9 via stationary tubular conduit 13. The feeder 9 may be either motor driven directly, through a set of gears shown or by appropriate sheaves, and may have provisions for speed variation. The freezer may contain automatic system controls for feeder speed, refrigerant supply, pressure governing the amounts and the velocities of coolant, temperature, vapor recirculation and mixing, gas exhaust and return to liquefier, if so desired, etc. For example, in FIGURE 1, temperature sensor 33 of a pneumatic temperature controller 34 actuates pilot conduits 35 identified by dotted lines, leading to the flow control valve 18 for an automatic refrigerant supply.

For optimum utilization of cooling capacity of the refrigerant, the freezer is provided with two insulated vents, terminating with single exhaust outlet 36. Vent 37 is located in or near freezer entrance opening 2 and vent 38 is located in or near freezer exit opening 3. Each vent is provided with a butterfly valve 39 for close regulation of the refrigerant distribution, enabling a finite temperature adjustment in both the product and the gases exhausted and providing means for a most efficient coolant utilization with product variation. For example, by closing vent 38, the refrigerant may be directed downward towards vent 37 to perform more precooling. The reversal would take place by manipulating valves 39 on vent 38 and exhaust 36.

Gases escaping exhaust outlet 36 may be directed to a reliquefier (not shown) and returned to dewar 16 for recycling, constituting optimum economy in a system that employs freezer of the present invention.

As FIGURE 2 shows, the stationary tubular conduit 13 enters the rotating helical feeder 9 through its partially hollow shaft 10, with ample clearance between respective parts, to continue co-axially along its entire hollow length and to supply refrigerant into the shaft cavity 11. Housing 12 centralizing stationary conduit 13 within the rotating shaft cavity 11 acts both as sealing means for the containment of the refrigerant within said shaft cavity 11 and as structural support means for conduit 13. As can be further seen from FIGURE 2, the feeder 9 is composed of said partially hollow shaft 10 and a helix 14. Helix 14 shown is of an inverted V-shape the lips of which constitute helix base 15. By securing said helix base 15 to the external surface of said shaft 10, by means of a continuous seam weld 19, the feeder becomes a structure entailing hollow helix with a continuous helical cavity 20 for refrigerant flow from shaft cavity 11 via apertures 21 provided in said shaft 10. The surface of said helix 14 entails a multiplicity of spray orifices 22 which permit refrigerant outflow in the form of high velocity vapor stream into the freezer proper 8 of FIGURE 1 containing the product. The flow pattern described above constitutes the basic refrigerant circuit through the feeder 9.

FIGURE 2a showing a detail of the feeder 9 structure across its hollow shaft 10 enlarged, amplifies the refrigerant flow pattern and the associated components discussed under FIGURE 2. It identifies refrigerant emerging from the end of the conduit 13 inside shaft cavity 11 from which it continues to flow via shaft apertures 21 into the helix cavity 20 and out through the multiple orifices 22 into the freezer proper 8 of FIGURE 1 for subsequent freezing out the product.

FIGURE 3 representing design modification in the feeder construction shows a cross sectional view of a simplified feeder 23 by section cut-out in which the feeder shaft 24 and the refrigerant supply conduit 25 are identical to shaft 10 and conduit 13 illustrated in FIGURES 2 and 2a. The refrigerant flowing from conduit 25 and entering shaft cavity 26 from which it escapes via shaft apertures 27 constitutes flow pattern identical to that described while discussing FIGURES 2 and 2a. However, instead of V-shaped helix 14 shown in FIGURES 2 and 2a used for refrigerant supply and distribution to the product, FIGURE 3 shows a solid plate helix 28 backed up by a continuous, integrally mounted tubular coil 29. Straight tubular sections 30 radially inserted and permanently secured inside said shaft apertures 27 on one end and openings 31 of said tubular coil 29 on another end provide flow communication means between said shaft cavity 26 and the inside of said tubular coil 29, and permit refrigerant flow into and along the entire length of coil 29. Orifices 32 conveniently located over the entire surface of the tubular coil 29 permit the refrigerant escape into the freezer proper 8, shown in FIGURE 1, for subsequent product freezing.

Although helical feeder 23 of FIGURE 3 offering a flow pattern identical to that of the feeder 9 of FIGURE 2 could be placed inside the freezer body 1 of FIGURE 1 interchangeably, its utilization in a specific quick freezer may be selective, depending on the characteristics of the product. Since V-shaped felix 14 of FIGURE 2 carrying refrigerant offers large extended heat exchange surface at low temperatures which being advantageous for most products and/or freezing processes may not be desired in some products due to potential product subfreezing while in a direct contact with cold helix surface which also acts as product feeder during its transit, the availability of the design of modified feeder 23 of FIGURE 3 could not be overemphasized. Feeder 23 could be further modified by moving tubular coil 29 away from the helix 28 should the process and/or product call for a more specific separation of the helix from the refrigerant carrying coil.

The design flexibility offered by feeder 23 permits numerous additional modifications with minimum expense in feeder fabrication. Indeed, the provisions offered by helical feeder designs of this invention constitute unparalleled means for attaining the necessary time-temperature profiles during freezing. The product moves rapidly by virtue of induced forward motion the minute feeder starts rotating: it continues to travel along its extended surface for the duration of time equivalent to that prevailing in most modern tunnel freezers, with indicated overall freezers, with indicated overall freezer efficiency greater than that attainable with other designs.

From the above description it will, therefore, be seen that the present invention entails great potentials for its adaptation to various freezing processes in which product quality, speed and ultimate economy is of importance. For example, in ice cream production, freezing apparatus of present invention when coupled with the homoegnizer can eliminate few process steps which at present employ inefficient coil coolers, holding tanks, air coolers and hardeners. Such process simplification may permit instantaneous production of ice cream of improved quality in stores and in ice cream stands at equivalent or lower process cost, even though cost of the cryogenic refrigerant at present is known to be higher than the plug-in electric power. Elimination of costly distribution in insulated low temperature bodies of truck-trailers, let alone potential product deterioration en route, is certainly a significant economical advantage which could be realized by the use of the quick freezer of this invention. Similar benefits could be realized in other freezing processes which employ equipment of present invention.

It will be understood that variations and modifications in freezer design may be elected without departing from the novel concepts of the present invention.

What is claimed is:

1. A quick freezing apparatus comprising an insulated double-walled cylindrical body proportioned to receive an appropriate size rotatable helical feeder, insulated portal openings for product delivery and discharge, said openings communicating with the interior of said freezer including feeder helix therein, closure means for said portals, refrigerant supply means to the helix, said helix having plurality of orifices in communication with freezer proper for the refrigerant flow, venting means for said freezer proper at locations spaced from said portals, valving said venting having open or openable means in communication with exhaust means, temperature controls means extending into vicinity of freezer proper, and sealing means for said feeder thereby assuring minimum refrigerant loss during product freezing within said freezer proper.

2. A quick freezer as defined in claim 1 in which the helical feeder having an inverted V-shape helix with tip edge that approaches congruency with the inside of the surrounding cylindrical freezer walls and with two sided base, edges of which are permanently secured to the surface of partially or continuously hollow shaft by means of a continuous seam whereby substantially throughout the helix length there may be maintained a large cavity, refrigerant communicating means between said cavity and said hollow shaft including means of refrigerant communicating with interior of the freezer, stationary conduit means communicating with cavity of said hollow shaft, said conduit means also including stationary support means extending from the exterior of the freezer top at the center of one end of the cylindrical body, said support means centralizing said conduit means within said hollow shaft for interference free shaft rotation whereby the stationary support means also acting as sealing means through the use of appropriate packing therein.

3. A quick freezer as defined in claim 1 in which the helical feeder having a flat plate helix with external outer edge that approaches congruency with the inside of the surrounding cylindrical freezer walls and with inner edge that is permanently secured to the hollow shaft, refrigerant distributing means through a tubular coil, said tubular coil extending from one helix end to the other and comprising an integer part thereof, refrigerant communicating means between said tubular coil and said hollow shaft including means of refrigerant communicating with interior of the freezer, stationary conduit means communicating with cavity of said hollow shaft, said conduit means also including stationary support means extending from the exterior of the freezer top at the center of one end of the cylindrical body, said support means centralizing conduit means within said hollow shaft for interference free shaft rotation whereby the stationary support means also acting as sealing means through the use of appropriate packing therein.

4. Quick freezing means comprising a rotatable helical feeder within a stationary insulated cylindrical freezer body, feeder driving means, liquefied gas storage means, said liquefied gas acting as refrigerant, supply line means leading from said liquefied gas (refrigerant) storage means to the interior or said freezer body, flow control means comprising a flow control valve placed in the vicinity of the refrigerant storage means and an automatic controller conveniently located thereby, said automatic controller having temperature preselected setting and sensing means, including pilot signal means in communication within said flow control valve, said sensing means inserted into the freezer proper at a location most satisfactory for a specific product, portal openings in said freezer body for product entrance-exit, including closure means for said portals, vent means having communication with said freezer inside and adjacent to said portals, and exhaust means, said exhaust in direct communication with said vents each of which entailing appropriate valving means for controlling direction of the refrigerant flow before venting, thereby insuring optimum refrigerant utilization.

5. A quick freezing apparatus comprising an insulated body having a cylindrical interior proportioned to receive a rotatable helical feeder of appropriate size, a rotatable feeder helix therein, insulated portal openings for product delivery and discharge, said openings communicating with the interior of said freezer, closure means for said portals, means for supplying refrigerant to the helix, said helix having a plurality of orifices in communication with the interior of the freezer for refrigerant flow, means for venting said freezer interior, valving for said venting means having open or openable means in communication with exhaust means, and sealing means for said feeder for reducing refrigerant loss during product freezing within said freezer interior.

References Cited

UNITED STATES PATENTS

| | | | |
|---|---|---|---|
| 2,879,005 | 3/1959 | Jarvis | 62—374 X |
| 3,214,928 | 11/1965 | Oberdorfer | 62—64 X |
| 3,277,657 | 10/1966 | Harper et al. | 62—63 |
| 3,300,993 | 1/1967 | Schlemmer | 62—63 |

ROBERT A. O'LEARY, *Primary Examiner.*

WILLIAM E. WAYNER, *Assistant Examiner.*